United States Patent [19]

Dourra et al.

[11] Patent Number: 5,669,850
[45] Date of Patent: Sep. 23, 1997

[54] SHIFT HUNTING PREVENTION FOR AN AUTOMATIC TRANSMISSION

[75] Inventors: Hans A. Dourra, Dearborn Heights; Howard L. Benford, Bloomfield Hills; Maurice B. Leising, Clawson, all of Mich.

[73] Assignee: Chrysler Corporation, Auburn Hills, Mich.

[21] Appl. No.: 662,593

[22] Filed: Jun. 13, 1996

[51] Int. Cl.$^6$ ................................................. B60K 41/04
[52] U.S. Cl. .................... 477/108; 477/110; 74/336 R
[58] Field of Search ........................ 477/108, 110, 477/111, 139, 141; 74/336 R, 336.5; 475/123, 257, 118

[56] References Cited

U.S. PATENT DOCUMENTS

| | | | |
|---|---|---|---|
| 4,875,391 | 10/1989 | Leising et al. | 477/155 |
| 4,905,545 | 3/1990 | Leising et al. | 477/133 |
| 4,951,200 | 8/1990 | Leising et al. | 364/424.1 |
| 5,088,351 | 2/1992 | Miyake et al. | 477/108 |
| 5,390,116 | 2/1995 | Hayafune | 477/903 X |
| 5,428,531 | 6/1995 | Hayafune | 477/107 X |
| 5,475,591 | 12/1995 | Suzuki et al. | 477/115 X |
| 5,498,195 | 3/1996 | White et al. | 477/110 |
| 5,558,598 | 9/1996 | Torimoto | 477/108 X |

*Primary Examiner*—Charles A. Marmor
*Assistant Examiner*—Peter T. Kwon
*Attorney, Agent, or Firm*—Mark P. Calcaterra

[57] ABSTRACT

An interactive cruise control system and method for providing automatic speed control of a vehicle with improved shifting of an automatic transmission. The system and method controls speed of a vehicle equipped with cruise control and minimizes downshifts in an automatic transmission of the vehicle. Vehicle speed is detected and compared with a setpoint speed which is associated with the cruise control system. Transmission gear shifting is determined based on predetermined shift schedule points. Determined transmission gear downshifts are prevented for a kickdown delay period based on vehicle speed loss and the presence of vehicle deceleration. Also provided is an overspeed reduction method for causing a transmission downshift during an overspeed condition with the throttle closed. Further, the system provides hunting prevention between both second gear and third gear as well as between third gear and fourth gear of a four speed automatic transmission.

7 Claims, 9 Drawing Sheets

SHIFT HUNTING PREVENTION FOR AN AUTOMATIC TRANSMISSION

BACKGROUND OF THE INVENTION

1. Technical Field

The present invention relates generally to an automotive vehicle cruise control system and, more particularly, to an interactive cruise control system and method of controlling vehicle speed with improved gear shifting for an automatic transmission.

2. Discussion

Automotive vehicles generally incorporate a motive force system having three basic components: an engine, a powertrain and wheels. The engine produces force by converting chemical energy from a liquid fuel into the mechanical energy of motion. The powertrain transmits the resultant force of this kinetic energy to the wheels which frictionally contact a surface for moving the vehicle. The main component of the powertrain is the transmission, which transmits engine torque over a relatively limited angular speed range to the wheels over a broader speed range, in accordance with the tractive-power demand of the vehicle. The transmission also controls the direction of rotation applied to the wheels so that the vehicle may be driven both forward and backward.

One advanced type of transmission is a four speed electronically controlled automatic transmission with overdrive. Examples of this type of electronically controlled automatic transmission are described in U.S. Pat. No. 4,875,391, entitled "An Electronically-Controlled, Adaptive Automatic Transmission System", issued on Oct. 24, 1989 to Leising et al; U.S. Pat. No. 4,905,545, entitled "Method of Controlling the Speed Change of a Kickdown Shift for an Electronic Transmission System", issued on Mar. 6, 1990 to Leising et al and U.S. Pat. No. 4,951,200, entitled "Method of Controlling the Apply Element During a Kickdown Shift for an Electronic Automatic Transmission System", issued on Aug. 21, 1990 to Leising et al. These patents are owned by the Assignee of the present application and are incorporated herein by reference. However, it should be appreciated that the principles of the present invention are not limited to any particular automatic transmission, and that the present invention may be applied to a wide variety of other powertrain configurations.

A vehicle is generally equipped with an electronic engine control system for controlling the operation of the engine and drivetrain of the vehicle. The electronic control system includes a microcomputer-based transmission control module capable of receiving and monitoring input signals indicative of various vehicle operating conditions such as engine speed, torque converter turbine speed, output vehicle speed, throttle angle position, brake application, hydraulic pressures, a driver selected gear or operating condition (PRNODDL), engine coolant temperature and/or the ambient air temperature. Based on the information contained in the monitored signals, the controller generates command or control signals for causing actuation of solenoid-actuated valves to regulate the application and release of fluid pressure to and from apply cavities of clutches or frictional elements of the transmission. Accordingly, the controller is typically programmed to execute predetermined shift schedules stored in memory of the controller through appropriate command signals to the solenoid-actuated valves.

In addition to controlling the vehicle operation based on a manual operator throttle input, a large number of todays vehicles are also equipped with a cruise control system for allowing automatic speed control of the vehicle. The conventional cruise control system generally includes an operator input for selecting a desired setpoint speed, an operator input for incrementally increasing and/or decreasing the desired setpoint speed and a resume speed control input to resume cruise control operation with a previously selected setpoint speed. As is commonly known, the basic cruise control system operates to control the engine throttle position so as to attempt to continually maintain the vehicle speed at or near the desired setpoint speed.

With vehicles equipped with an automatic transmission, the cruise control system may cause various repetitive and cyclical upshifting and downshifting of the automatic transmission as the transmission controller follows the predetermined shift schedules that are generally programmed in memory. For example, when traveling uphill, especially uphill on a steep incline, the transmission controller may upshift and downshift between gears several times in order to maintain the vehicle speed at or near the desired setpoint speed. Cyclical upshifting and downshifting of the transmission to maintain a speed setpoint can lead to a "shift hunting" condition. Repeated upshifts and downshifts in turn effect the overall sound and feel of the vehicle which can be noticeable to the driver and passengers. In addition, the individual upshifts or downshifts of the conventional automatic transmission can cause a sudden momentary increase or decrease in acceleration in an abrupt manner, especially when such changes cause large engine speed changes. Further, when a vehicle is traveling downhill, especially downhill on a steep grade, the vehicle may realize an overspeed condition despite the presence of a cruise control actuated throttle reduction. Speed adjustment for such an overspeed condition is usually not otherwise handled by the conventional cruise control system, nor is this overspeed condition generally remedied by the transmission controller.

It is therefore one object of the present invention to provide for a cruise control system and method of maintaining a cruise control setpoint speed for a motor vehicle while improving the sound, handling and feel of the vehicle.

It is another object of the present invention to provide for such a cruise control system and method which prevents or reduces noticeably abrupt changes in vehicle performance which may otherwise occur with upshifting and downshifting of a vehicle's automatic transmission so as to achieve smooth gear shifting performance.

It is yet another object of the present invention to provide for such a cruise control system and method which allows for a driver to manually override cruise control actuated shifting operations of an automatic transmission.

It is also another object of the present invention to provide for such a cruise control system and method which attenuates sudden increases in noise and acceleration (e.g., jerks) that may otherwise occur during upshifting or downshifting of an automatic transmission.

Further, it is another object of the present invention to compensate for the presence of an overspeed condition in a cruise control system such as that which may occur with a vehicle traveling downhill on a steep declining grade.

SUMMARY OF THE INVENTION

To achieve the foregoing objectives, the present invention is an interactive cruise control system and automatic transmission for a vehicle with improved shifting of the automatic transmission. The automatic system and method control gear shifts of the transmission so as to prevent the occurrence of shift hunting. With the transmission engaged in a first gear, the torque required to maintain a predetermined speed in the first gear is determined and a maximum torque available in an upshift condition to a second gear is predicted. An upshift from the first gear to the second gear is inhibited when the predicted maximum torque available in the second gear is less than the determined torque required to maintain the predetermined speed in the first gear. An upshift is allowed once the determined maximum torque available in the second gear exceeds the determined torque required to maintain the predetermined speed in the first gear. While engaged in second gear, the transmission determines torque required to maintain the predetermined speed in a third gear which is higher than the second gear and further predicts a maximum torque available in an upshift condition of the transmission to the third gear. An upshift from the second gear to the third gear is inhibited when the determined maximum torque available in the third gear is less than the determined torque required to maintain the predetermined speed in the second gear.

This application is one of several applications filed on the same date, all assignable to the assignee of the present application and having similar specifications and drawings, these applications being identified below by serial number and title:

| U.S. Ser. No. | Title |
| --- | --- |
| Docket No. 96-804 | Cruise Control Overspeed Reduction with Automatic Transmission. |
| Docket No. 95-827 | Kickdown Delay in Cruise Control for Automatic Transmission |

BRIEF DESCRIPTION OF THE DRAWINGS

Other objects and advantages of the present invention will become apparent to those skilled in the art upon reading the following detailed description and upon reference to the drawings in which.

DETAILED DESCRIPTION OF THE PREFERRED EMBODIMENT

Figure 1:
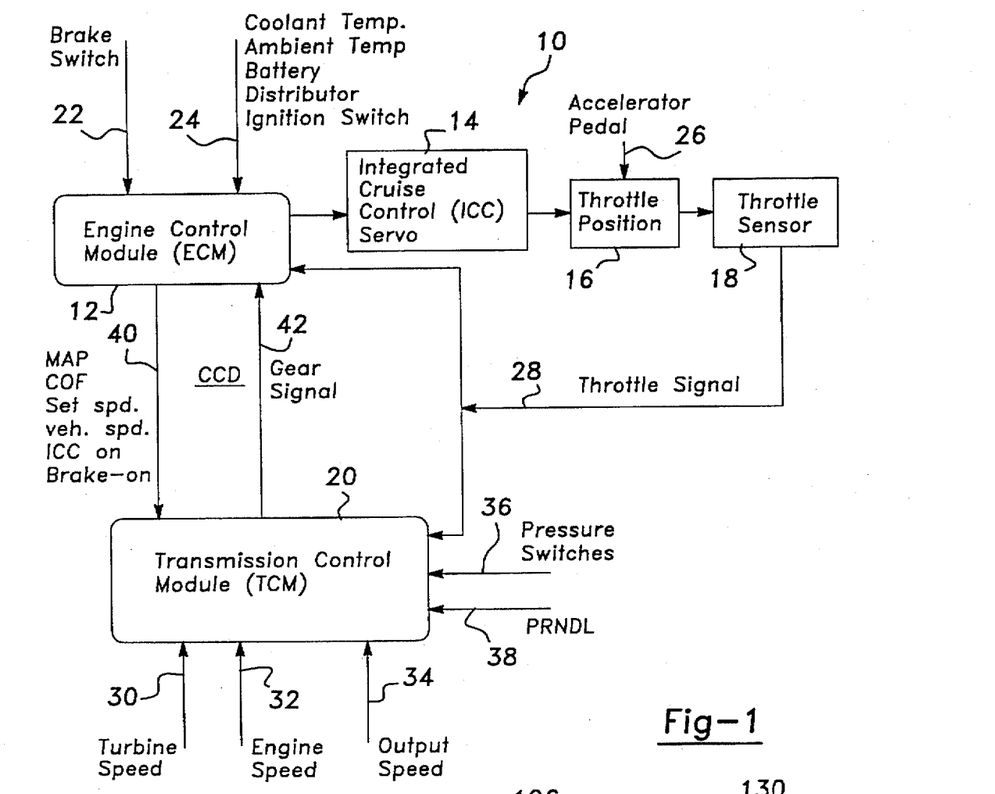
FIG. 1 is a block diagram of an interactive cruise control system of the present invention for use on a vehicle equipped with an automatic transmission.

Turning now to FIG. 1, an interactive cruise control system 10 is shown for use in a motor vehicle equipped with an automatic transmission. The interactive cruise control system 10 provides automatic vehicle speed control and advantageously reduces the number of transmission gear downshifts that would otherwise occur while operating in cruise control and improves the overall sound, handling and feel of the vehicle. The cruise control system 10 also provides an automatic downshift to increase engine braking during an overspeed condition in cruise control. Further, the interactive cruise control system 10 also enhances vehicle performance by preventing shift hunting for both a 4-3/3-4 shift condition as well as the 3-2/2-3 shift condition for a four speed automatic transmission. While the present invention is described in connection with an electronically controlled four-speed transmission, it should be appreciated that various other automatic transmissions may be employed in connection with the cruise control system 10 of the present invention.

The interactive cruise control system 10 is shown with an integrated cruise control (ICC) servo 14 that is preferably integrated with an engine control module (ECM) 12. Cruise control system 10 is also shown with a throttle position 16, throttle sensor 18 and a transmission control module (TCM) 20. The engine control module 12 receives inputs such as a brake switch signal 22 as well as various other signal inputs 24 which include coolant temperature, ambient temperature, battery, distributer and ignition switch information as is generally provided to an engine control module in a motor vehicle. The integrated cruise control servo 14 is preferably integrated with the engine control module 12 and processes input and vehicle operating information to provide cruise control operations according to the present invention.

More particularly, the integrated cruise control servo 14 processes information so as to maintain the speed of the vehicle at or near the desired setpoint speed as will be described herein. In accordance with normal cruise control operations, the integrated cruise control servo 14 thereby operates to control the engine throttle position 16 which in turn influences the vehicle speed. An operator-actuated accelerator pedal 26 also controllably actuates the throttle position 16. With the cruise control system 10 deactivated or with the presence of a manual override of the cruise control, the throttle position 16 is controlled in response to the driver-actuated accelerator pedal 26. The throttle position 16 is monitored by throttle sensor 18 which in turn provides a throttle signal 28 that is input to both the engine control module 12 and the transmission control module 20.

The transmission control module 20 receives various inputs which include turbine speed 30, engine speed 32 and output speed 34. Transmission control module 20 further receives pressure switch inputs 36 and a driver selected transmission position (PRNDL) signal 38 which provides an indication of the manually selectable transmission operating mode. The transmission control module 20 transmits a gear signal 42 to the engine control module 12 via a communication line or network such as the Chrysler Collision Detection (CCD) network. Also, transmission control module 20 receives various inputs 40 from the engine control module 12 via the CCD network. These inputs 40 include manifold pressure (MAP), cruise override flag (COF), vehicle setpoint speed, vehicle speed, integrated cruise control (ICC) "on" and brake-on signals.

The interactive cruise control system 10 as will be described hereinafter reduces the overall number of automatic transmission downshifts that may otherwise occur and improves vehicle sound, handling and feel in accordance with a kickdown delay inhibit. In addition, the integrated cruise control system 10 further provides prevention of shift hunting for both a four-three/three-four shift hunting condition and a three-two/two-three shift hunting condition, for the four speed transmission application shown and described herein. Furthermore, the interactive cruise control system 10 also reduces vehicle overspeed conditions in cruise control by providing an automatic transmission gear downshift so as to increase engine braking to reduce vehicle speed to thereby minimize overspeed. These and various other features of the cruise control system 10 of the present invention are described herein.

KICKDOWN DELAY

Figure 2A:
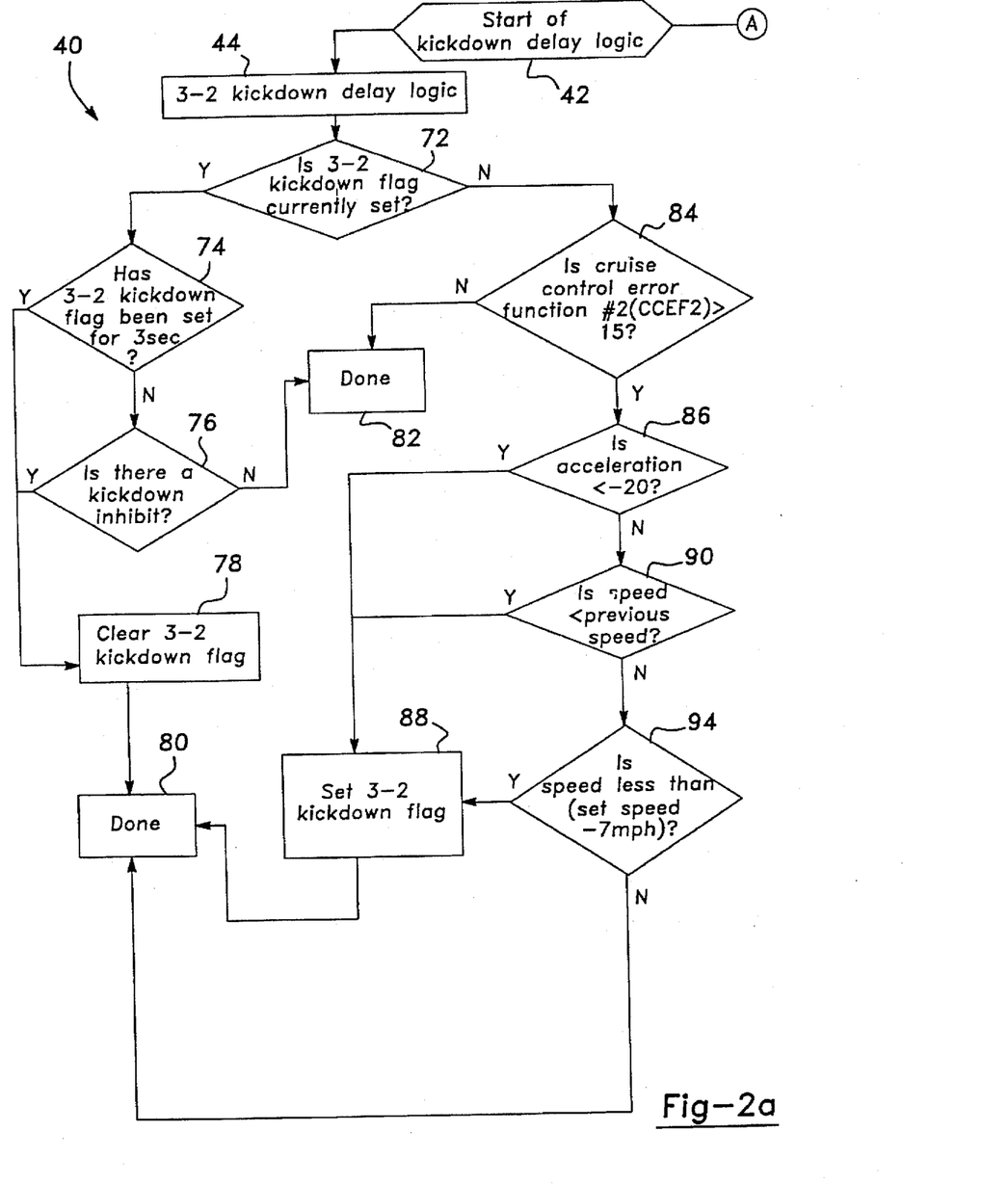
FIGS. 2A and 2B are flow diagrams which illustrate a methodology of providing a kickdown delay for an automatic transmission with the cruise control system.
Figure 2B:
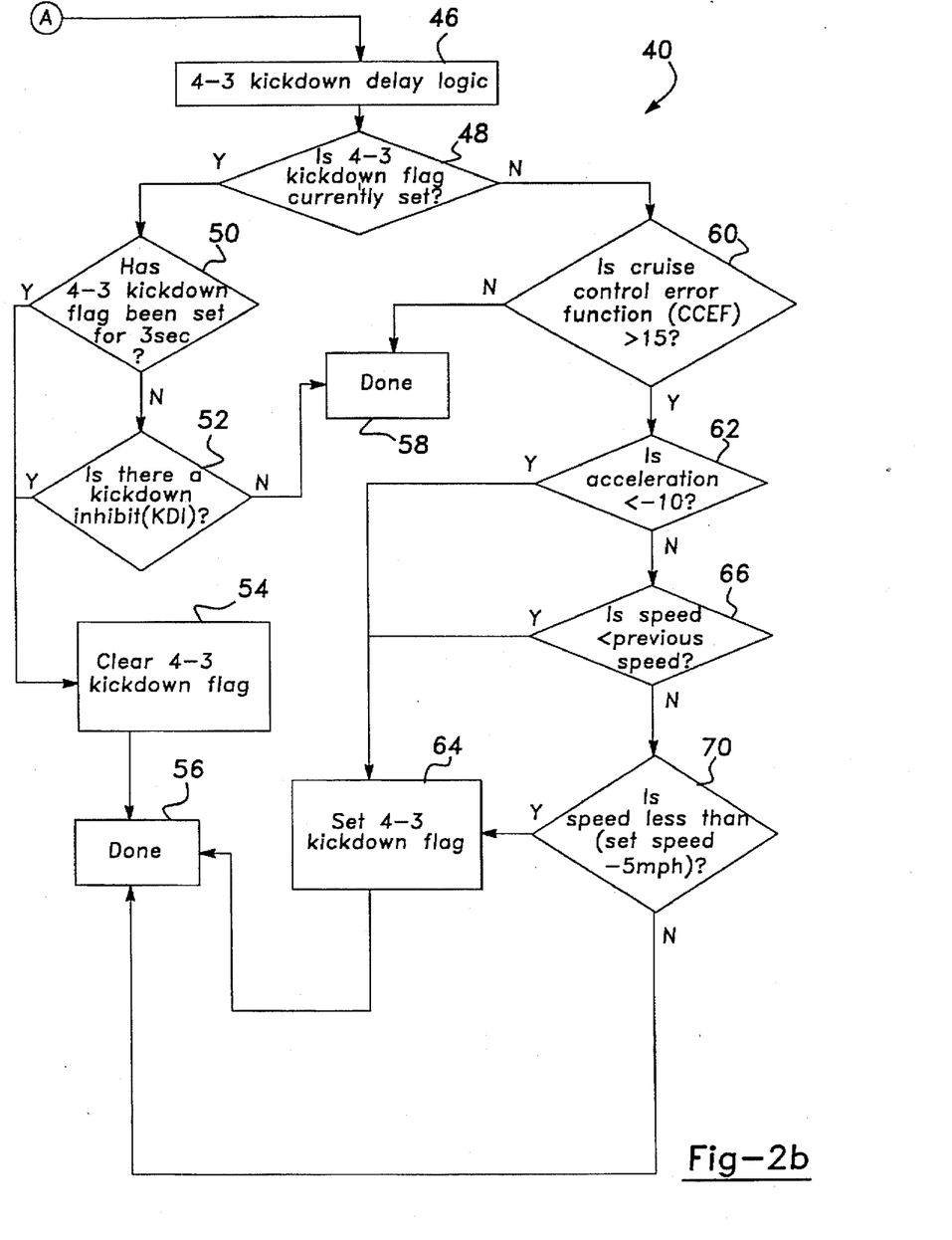

The interactive cruise control system 10 includes a transmission kickdown delay inhibit feature for minimizing downshifting of an automatic transmission. Illustrated in FIGS. 2A and 2B is a methodology 40 of controlling a three-to-two (3-2) transmission gear shift with kickdown delay and a four-to-three (4-3) gear shift with kickdown delay in accordance with a kickdown delay control feature for an automatic transmission equipped with cruise control. As shown in FIG. 2B, kickdown delay methodology 40 begins the 4-3 kickdown delay pursuant to logic block 46. Decision block 48 checks for whether a 4-3 kickdown flag is currently set and, if so, decision block 50 checks to see if the 4-3 kickdown flag has been set for a time period of three seconds, for example. If the 4-3 kickdown flag has not been set for the requisite time period, decision block 52 checks for the presence of a kickdown inhibit (KDI). If there is no kickdown inhibit present, kickdown delay methodology 40 is done as indicated by block 58. Contrarily, if the 4-3 kickdown flag has been set for the requisite three second time period, or if there is a kickdown inhibit, kickdown delay methodology 40 clears the 4-3 kickdown flag pursuant to block 54. Thereafter, the kickdown delay methodology 40 is done as indicated by block 56.

Returning to decision block 48, if the 4-3 kickdown flag is not set, kickdown delay methodology 40 will compare a cruise control error function (CCEF) with a predetermined value, say a value of fifteen for example, as provided in decision block 60. If the cruise control error function (CCEF) exceeds the predetermined value, a comparison is performed pursuant to decision block 62 to compare acceleration with a predetermined acceleration value of negative ten (−10), according to one example. Otherwise, if the cruise control error function (CCEF) does not exceed the predetermined value methodology 40 is done as indicated by block 58. If the acceleration is not less than the predetermined acceleration value of decision block 62, a comparison is performed to compare the current vehicle speed with the previous speed pursuant to decision block 66. If the current vehicle speed is not less than the previous speed, decision block 70 will check to see if the current vehicle speed has dropped below the setpoint speed minus an offset value of say five miles per hour, for example, and if not, methodology 40 is done as indicated by block 56. However, if the vehicle acceleration is less than the predetermined vehicle acceleration value, or if the current vehicle speed is less than the previous speed, or if the current vehicle speed is less than the setpoint speed minus the offset value, the kickdown delay methodology 40 will proceed to block 64 to set the 4-3 kickdown flag.

Referring to the 3-2 kickdown delay block 44 shown in FIG. 2A, the kickdown delay methodology 40 will check to see if the 3-2 kickdown flag is currently set pursuant to decision block 72. If the 3-2 kickdown flag is set, decision block 74 will check to see if the 3-2 kickdown flag has been set for a time period of three seconds, for example, and if not, decision block 76 will check for the presence of a kickdown inhibit. With no kickdown inhibit present, methodology 40 is done as indicated by block 82. If the 3-2 kickdown flag has been set for the requisite three second time period, or if there is a kickdown inhibit, block 78 will clear the 3-2 kickdown flag and complete kickdown delay methodology 40 as indicated by block 80.

Returning to decision block 72, if the 3-2 kickdown flag is not set, decision block 84 will compare a cruise control error function #2 (CCEF2) with a predetermined value of fifteen, according to one example. If cruise control error function #2 (CCEF2) is less than or equal to the predetermined value, methodology 40 is complete as provided by block 82. If the cruise control error function #2 (CCEF2) is greater than the predetermined value, a comparison will be performed to compare the acceleration of the vehicle with an acceleration value of say negative twenty (−20), for example, as provided in decision block 86. If the vehicle acceleration is not less than the acceleration value, decision block 90 will compare the current speed of the vehicle with the previous speed. If the current vehicle speed is not less than the previous speed, decision block 94 will compare the current vehicle speed with a setpoint speed minus some offset value of say seven miles per hour, for example. If the vehicle acceleration is less than the acceleration value, or if the current vehicle speed is less than the previous speed, or if the current vehicle speed is less than then the setpoint speed minus the offset value, then the kickdown delay methodology 40 will proceed to block 88 to set the 3-2 kickdown flag.

Figure 3A:
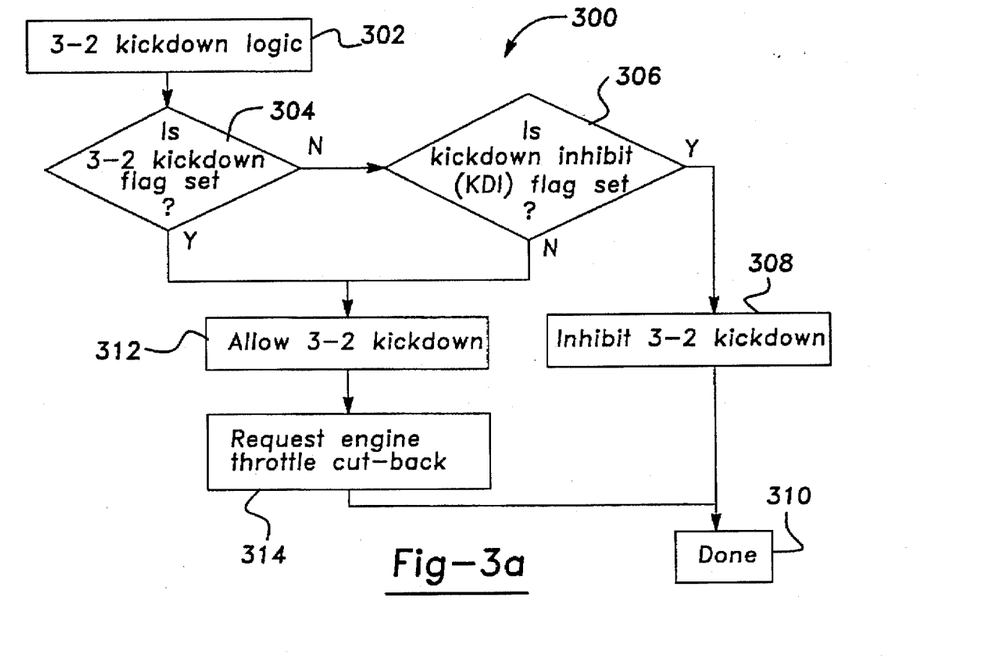
FIGS. 3A and 3B are flow diagrams illustrating respective methodologies for performing a 3-2 transmission kickdown and a 4-3 transmission kickdown and further illustrates a throttle cut-back.
Figure 3B:
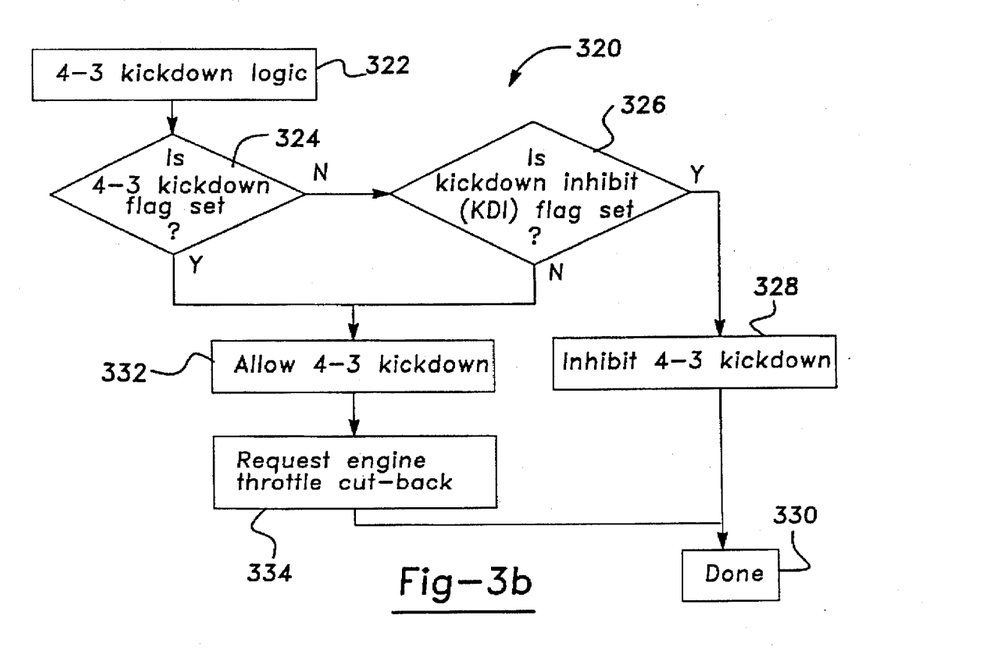

FIGS. 3A and 3B illustrate methodology 300 for performing a 3-2 kickdown and methodology 320 for performing a 4-3 kickdown, respectively. Referring to FIG. 3A, 3-2 kickdown methodology 300 begins with the 3-2 kickdown logic block 302 which proceeds to check whether the 3-2 kickdown flag is set pursuant to decision block 304. If the 3-2 kickdown flag is not set, decision block 306 will check to see if the kickdown inhibit (KDI) flag is set and, if set will inhibit a 3-2 transmission kickdown pursuant to block 308. Thereafter, 3-2 kickdown methodology 300 is complete pursuant to block 310. If either of the 3-2 kickdown flag is set pursuant to decision block 304 or if the kickdown inhibit flag is not set pursuant to decision block 306, methodology 300 will proceed to allow a 3-2 transmission gear kickdown to occur pursuant to block 312. Accordingly, the automatic transmission is able to perform a downshift from third gear to second gear provided the predetermined shift schedule still indicates the need for a downshift.

During a transmission gear kickdown, block 314 will request an engine throttle cut-back before completing the kickdown methodology 300. The engine throttle cut-back advantageously reduces the throttle position during a downshift of the automatic transmission in order to attenuate any sudden increase in noise and/or acceleration that may otherwise occur during a transmission gear downshift. Thus, the downshift is less noticeable and the cruise control setpoint speed is achieved through a smooth transition from third gear to the next lower gear which is second gear.

Referring to FIG. 3B, 4-3 kickdown methodology 320 begins with the 4-3 kickdown logic block 322 which proceeds to check whether the 4-3 kickdown flag is set pursuant to decision block 324. If the 4-3 kickdown flag is not set, decision block 326 will check to see if the kickdown inhibit (KDI) flag is set and, if set will inhibit a 4-3 transmission kickdown pursuant to block 328. Thereafter, 4-3 kickdown methodology 320 is complete pursuant to block 330. If either of the 4-3 kickdown flag is set pursuant to decision block 324 or if the kickdown inhibit flag is not set pursuant to decision block 326, methodology 320 will proceed to allow a 4-3 transmission gear kickdown to occur pursuant to block 332. Accordingly, the automatic transmission is able to perform a downshift from fourth gear to third gear provided the predetermined shift schedule still indicates the need for a downshift.

During the kickdown from fourth gear to third gear (e.g., 4-3), block 334 will request an engine throttle cut-back so as to reduce the throttle to attenuate any sudden increase in noise and/or acceleration that may otherwise occur with a downshift from fourth gear to third gear of the automatic transmission. This advantageously smooths the transition from fourth gear to third gear to reduce any abrupt noise and deceleration changes which may otherwise occur during a downshift.

Figure 4:
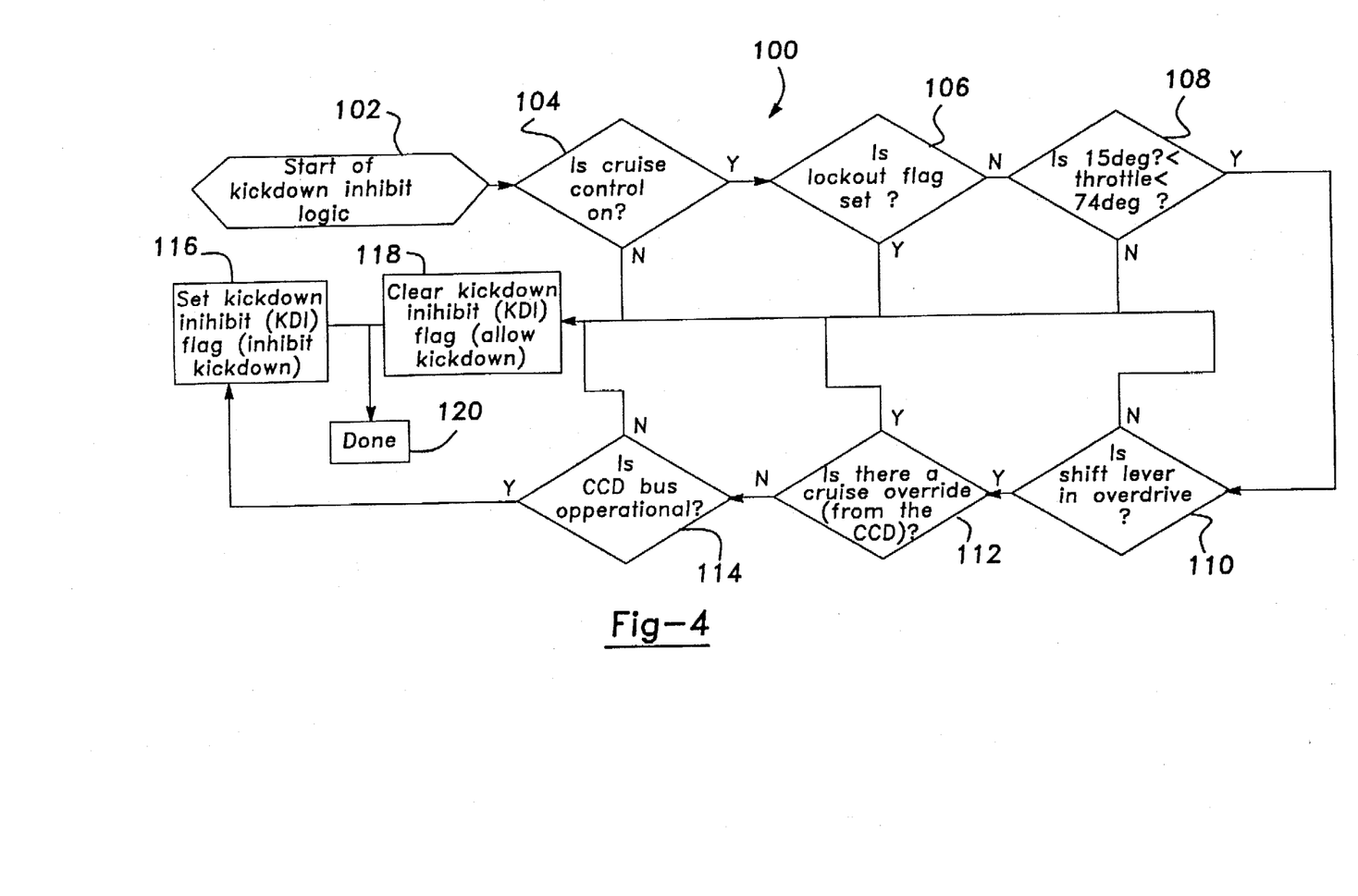
FIG. 4 is a flow diagram illustrating a methodology of setting and clearing a kickdown inhibit flag for use in the transmission kickdown delay methodology of FIG. 2.

The logic that may be employed to determine the presence of a kickdown inhibit is provided in kickdown inhibit methodology 100 as provided in FIG. 4. Kickdown inhibit methodology 100 starts with block 102 and proceeds to check to see if the cruise control is currently "on" (e.g., activated) pursuant to block 104. If the cruise control is activated, decision 106 will look to see if a lockout flag is set and, if the lockout flag is not set, decision block 108 will look to see if the throttle position is within a predetermined throttle range. For example, a predetermined angular throttle range of fifteen degrees to seventy-four degrees (15°–74°) may be employed according to one embodiment. If the cruise control is not activated, or if a lockout flag is set, or if the throttle position is not within the predetermined throttle range, the kickdown inhibit methodology 100 will clear the kickdown inhibit (KDI) flag which may allow a kickdown pursuant to block 118, and will thereafter be done pursuant to block 120. Otherwise, if the throttle position is within the predetermined throttle range, kickdown inhibit methodology 100 will look to see if the shift lever is in overdrive pursuant to decision block 110 and, if the shift lever is not in overdrive, methodology 100 will proceed to clear the kickdown inhibit flag so that a kickdown may occur. With the shift level in overdrive, decision block 112 will look to see if there is a cruise control override indicative of the operator of the vehicle applying the throttle to override the cruise control system. With a cruise control override, the kickdown inhibit flag is cleared so as to allow for a manual overriding kickdown to the next lower gear. Without the presence of a cruise control override, a non-operational CCD bus may also clear the kickdown inhibit flag as provided in decision blocks 114 and 118. Otherwise, the kickdown inhibit flag is set pursuant to block 116 so as to provide the normal cruise control inhibit kickdown as defined in kickdown delay methodology 40.

Figure 5:
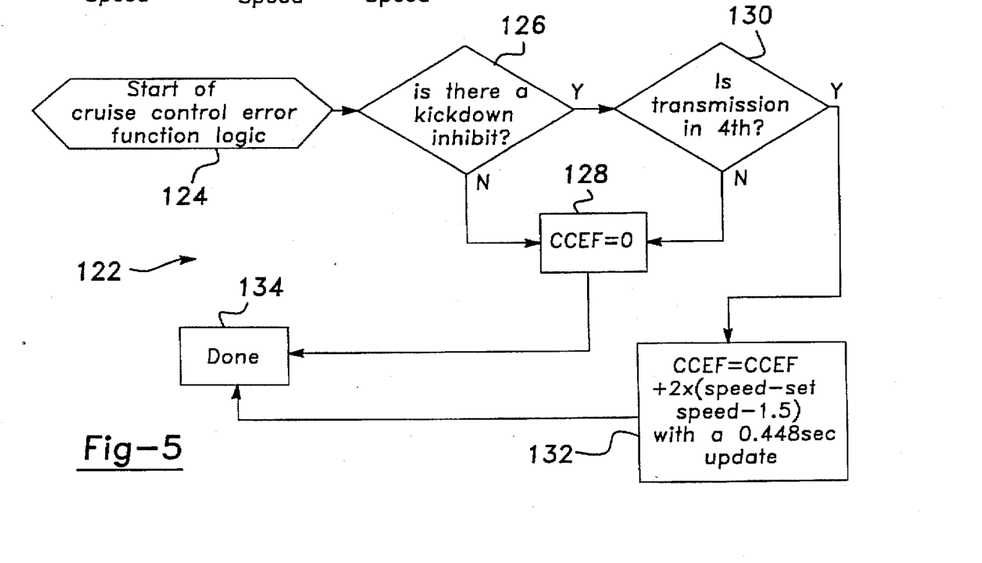
FIG. 5 is a flow diagram illustrating the determination of a first cruise control error function variable for use in the kickdown delay methodology.

With particular reference to FIG. 5, a methodology 122 is provided for determining the cruise control error function (CCEF) as employed in kickdown delay methodology 40 shown in FIG. 2B. Methodology 122 begins with start block 124 and proceeds to decision block 126 to check for the presence of a kickdown inhibit. Without the presence of a kickdown inhibit, block 128 provides that methodology 122 will set the cruise control error function (CCEF) equal to zero and complete methodology 122 as indicated by block 134. If there is a kickdown inhibit present, decision block 130 will check to see if the automatic transmission is currently engaged in fourth gear. If the transmission is not currently in fourth gear the cruise control error function (CCEF) is set equal to zero as provided in block 128. With the automatic transmission engaged in fourth gear, the cruise control error function is computed pursuant to block 132.

The current cruise control error function (CCEF) is an update of the previous cruise control error function (CCEF) summed with twice the setpoint speed minus twice the vehicle speed minus a constant value of three. The cruise control error function (CCEF) update is shown in equation form as follows:

$$CCEF = CCEF + 2*(Vehicle\ Speed - Setpoint\ Speed - 1.5).$$

The cruise control error function (CCEF) is periodically computed and updated at a 0.448 second update rate, according to one example. Accordingly, the cruise control error function (CCEF) is continually updated in accordance with the update rate and will vary depending on vehicle speed during each update. The updated cruise control error function (CCEF) is then used in accordance with decision block 60 for a comparison with a predetermined value as described in connection with kickdown delay methodology 40 as shown in FIG. 2B.

Figure 6:
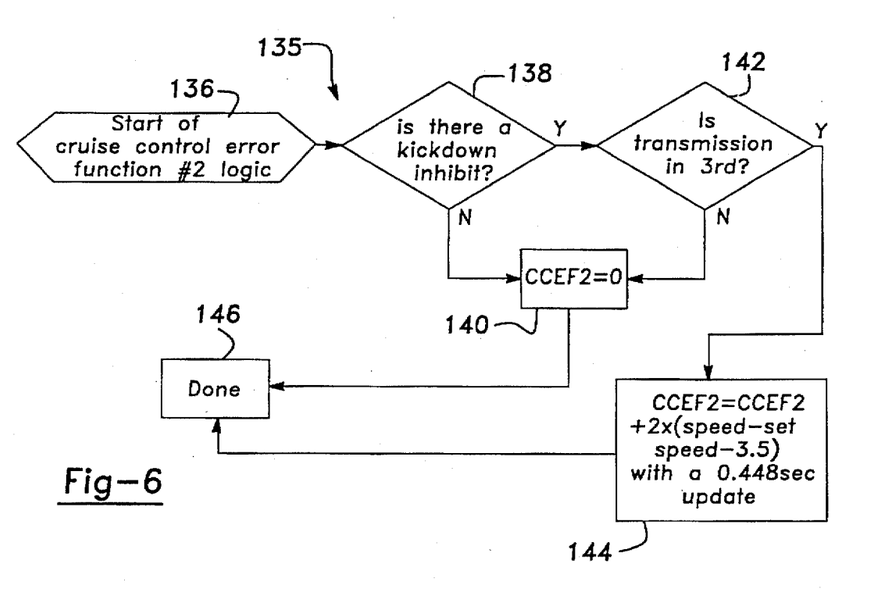
FIG. 6 is a flow diagram further illustrating the determination of a second cruise control error function variable for use in the kickdown delay inhibit methodology.

Referring to FIG. 6, a methodology 135 of computing the cruise control error function #2 (CCEF2) is provided for use with kickdown delay methodology 40 as shown in decision block 84 of FIG. 2A. The methodology 135 begins with block 136 and proceeds to look to see if there is a kickdown inhibit present pursuant to decision block 138. If not, the cruise control error function #2 (CCEF2) is set equal to zero pursuant to block 140 and methodology 135 is thereafter done as provided in block 146. With a kickdown inhibit present, methodology 135 will look to see if the automatic transmission is engaged in third gear pursuant to decision block 142. If the transmission is not engaged in third gear, the cruise control error function #2 (CCEF2) is set equal to zero as provided in block 140. However, with the transmission engaged in third gear, block 144 provides that methodology 135 will compute the cruise control error function #2 (CCEF2) which is equal to the previous cruise control error function #2 summed with twice the vehicle speed minus twice the setpoint speed minus a constant value of seven. The cruise control error function #2 (CCEF2) update is shown in equation form below:

$$CCEF2 = CCEF2 + 2*(Vehicle\ Speed - Setpoint\ Speed - 3.5).$$

The cruise control error function #2 (CCEF2) is periodically computed and updated at a 0.448 second update rate, according to one example. Accordingly, the cruise control error function #2 (CCEF2) is likewise updated in accordance with the update rate and vehicle speed and will be compared with a predetermined value as defined in decision block 84 of kickdown delay methodology 40 as shown in FIG. 2A.

Accordingly, the interactive cruise control system 10 according to the transmission kickdown delay inhibit feature operates to reduce the overall number of downshifts that would otherwise occur in an automatic transmission of the vehicle. This is accomplished by kickdown delay methodology 40 detecting speed of the vehicle and comparing the vehicle speed with the setpoint speed associated with the cruise control system. Methodology 40 determines the presence of deceleration of the vehicle which may be determined based on the change in vehicle speed. Transmission gear shifts are continually determined based on predetermined shift schedule points programmed into memory. The kickdown delay methodology 40 prevents or inhibits a scheduled transmission gear downshift over a delay period based on an updated vehicle speed loss value and the presence of vehicle deceleration. The vehicle speed loss value is a function of the comparison of vehicle speed and setpoint speed and time. Once the delay period has lapsed, the automatic transmission is allowed to downshift according to the predetermined shift schedule points. Accordingly, kickdown delay methodology 40 inhibits downshifting of the automatic transmission under circumstances such as where the need for a downshift is intermittent or where a cyclical upshifting and downshifting of the automatic transmission may otherwise occur.

SHIFT HUNTING PREVENTION

Figure 7:
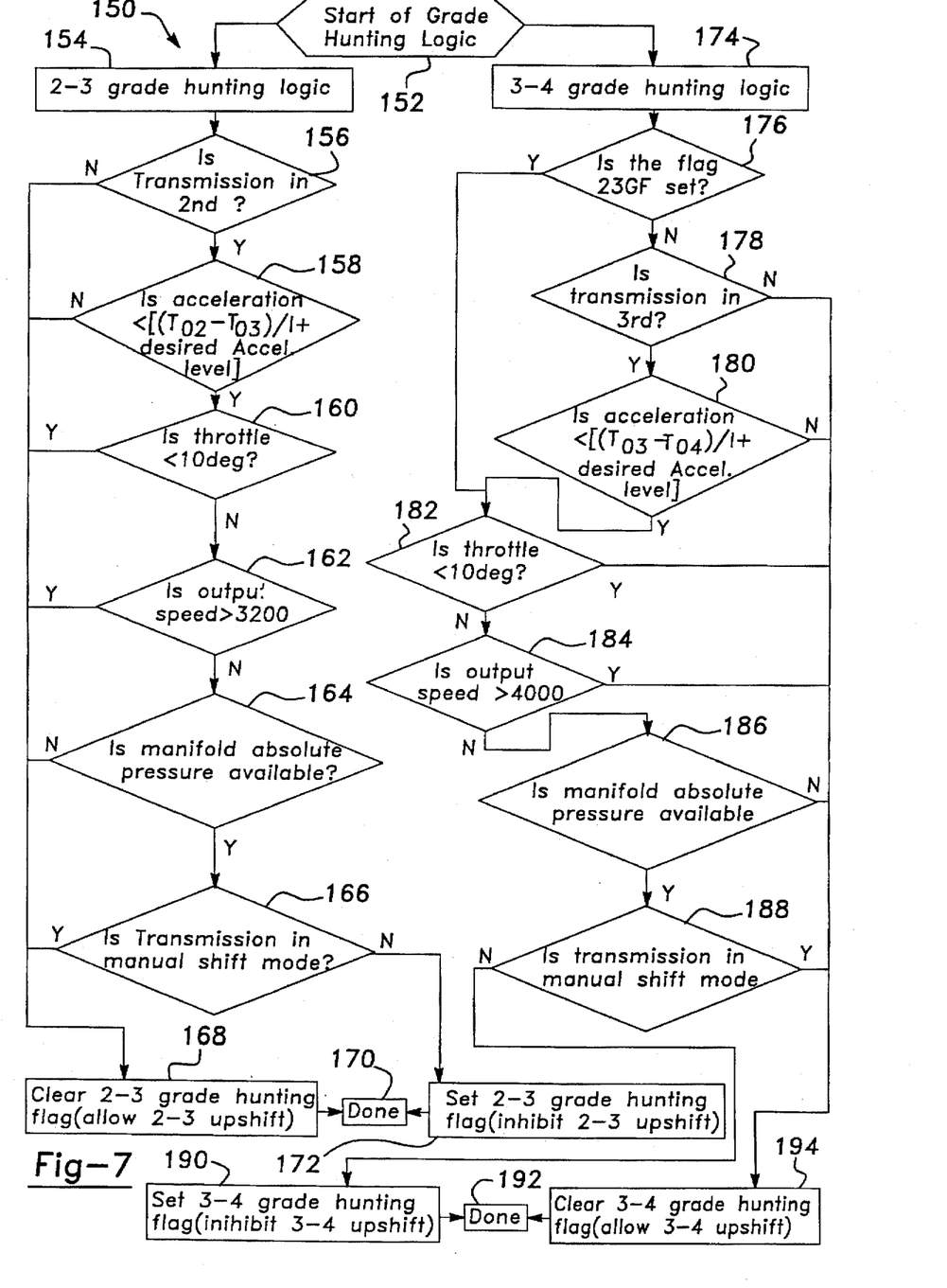
FIG. 7 is a flow diagram illustrating a methodology for preventing shift hunting in an automatic transmission.

The interactive cruise control system 10 also prevents four-three/three-four (4-3/3-4) shift hunting as well as three-two/two-three (3-2/2-3) shift hunting according to methodology 150 as provided in FIG. 7. The purpose of the shift hunting prevention methodology 150 is to determine whether the vehicle can maintain a desired speed in the next higher gear and, if it is determined that the vehicle cannot satisfactorily maintain the desired speed in the next higher gear, to inhibit the scheduled upshift. Generally speaking, this is accomplished by monitoring acceleration of the vehicle and comparing the vehicle acceleration to a computed comparison value indicative of the next higher gear acceleration capability, based on the difference between observed transmission output torque in the current gear and expected potential torque in the next higher gear. If the observed acceleration value is lower than the computed comparison value, the scheduled upshift is inhibited. Methodology 150 prevents shift hunting from occurring between second and third gear shifts as well as between third and fourth gear shifts and requires a transmission transition from second gear to third gear to fourth gear so as to prevent a direct shift from second gear to fourth gear. This advantageously provides for smooth transmission gear shifting among the transmission gears.

The shift hunting prevention methodology 150 starts at block 152 and proceeds to either the 2-3 grade hunting logic 154 or the 3-4 grade hunting logic 174. With the 2-3 grade hunting logic 154, decision block 156 checks to see if the transmission is currently engaged in second gear, and if it is not engaged in second gear, clears the 2-3 grade hunting flag pursuant to block 168. Clearing the 2-3 grade hunting flag allows for a second gear to third gear upshift to occur and completes methodology 150 pursuant to block 170. Contrarily, if the transmission is engaged in second gear, decision block 158 will check to see if the vehicle acceleration is less than a computed comparison value. The computed comparison value is computed as the difference between the transmission output torque $T_{O2}$ available in second gear and the transmission output torque $T_{O3}$ available in third gear divided by reflected vehicle inertia (I) and summed with a desired acceleration level.

If the vehicle acceleration is not less than the computed comparison value, methodology 150 proceeds to clear the 2-3 grade hunting flag as provided in block 168. Otherwise, if the vehicle acceleration is less than the computed comparison value, methodology 150 will proceed to decision block 160 to check if the throttle position is less than a low throttle position of ten degrees and, if so, methodology 150 jumps to block 168. Contrarily, if the throttle position is greater than or equal to the low throttle ten degree position, methodology 150 will proceed to decision block 162 to compare output speed with a high speed value of 3200 RPM. If the output speed exceeds the high speed value of 3200 RPM, methodology 150 jumps to block 168. If the output speed is less than or equal to the high speed value and manifold pressure is available as determined by decision block 164, methodology 150 will next go to decision block 166 to check whether the transmission is in a manual shift mode. If the transmission is not in a manual shift mode, methodology 150 will set the 2-3 grade hunting flag so as to inhibit a 2-3 upshift pursuant to block 172. Thereafter, methodology 150 is done pursuant to block 170. If the manifold pressure is not available or the transmission is in a manual shift mode, methodology 150 will clear the 2-3 grade hunting flag pursuant to block 168 and thereafter be complete as provided in block 170.

Referring to the 3-4 grade hunting logic of block 174, shift hunting prevention methodology 150 proceeds to decision block 176 to check if the 2-3 grade hunting flag is set. If the 2-3 grade hunting flag is not set, methodology 150 proceeds to decision block 178 to check if the transmission is currently engaged in third gear. If not engaged in third gear, methodology 150 proceeds to clear the 3-4 grade hunting flag pursuant to block 194 which allows a 3-4 upshift to occur and methodology 150 is done thereafter pursuant to block 192. With the transmission engaged in third gear, decision block 180 will check to see if the vehicle acceleration is less than a computed comparison value. The computed comparison value in block 180 is computed as the difference between the transmission output torque $T_{O3}$ available in third gear and the transmission output torque $T_{O4}$ available in fourth gear divided by the reflected vehicle inertia (I) and summed with a desired acceleration level. If the vehicle acceleration is not less than the computed comparison value, methodology 150 proceeds to block 194 to clear the 3-4 grade hunting flag. Otherwise, if the vehicle acceleration is less than the computed comparison value, methodology 150 proceeds to block 182 to compare the throttle position with a low throttle position of ten degrees. Referring back to block 176, if the 2-3 grade hunting flag is set, methodology 150 proceeds directly to block 182 to compare throttle position with the low throttle position of ten degrees.

If the throttle position is less than the low throttle position of ten degrees, methodology 150 proceeds to block 194 to clear the 3-4 grade hunting flag. Otherwise, if the throttle position is greater than or equal to the low throttle position of ten degrees, methodology 150 proceeds to decision block 184 to check to see if the output speed is greater than a high speed value of 4,000 RPM. If output speed exceeds the high speed value of 4,000 RPM, the 3-4 grade hunting flag is cleared pursuant to block 194. If the output speed is less than or equal to 4,000 RPM, methodology 150 will check to see if the manifold absolute pressure is available pursuant to decision block 186 and, if the manifold absolute pressure is not available, will proceed to block 194 to clear the 3-4 grade hunting flag. Contrarily, if manifold pressure is available, decision block 188 will check to see if the transmission is in manual shift mode and, if so, proceeds to block 194. Otherwise, provided decision block 188 determines the transmission is not in the manual shift mode, methodology 150 will proceed to set the 3-4 grade hunting flag pursuant to block 190. This in effect inhibits a 3-4 upshift from occurring. Once a 3-4 grade hunting flag is set, methodology 150 is done as provided in block 192.

Accordingly, the shift hunting prevention methodology 150 inhibits a normal 3-4 upshift until the calculations indicate positive vehicle acceleration can be maintained in the upshifted gear, thereby ensuring that a shift hunting condition is avoided. Additionally, the controller also inhibits a normal 2-3 upshift until the calculations indicate that a positive vehicle acceleration can be maintained in the upshifted gear, thereby ensuring that a shift hunting condition is avoided between second gear and third gear. This requires that the controller observe the torque required to maintain vehicle speed, predict the maximum torque available in the upshifted condition and inhibit any upshift that would not provide adequate torque. At the same time, methodology 150 prevents a direct shift between second gear and fourth gear by requiring a transition from second gear to third gear and then into fourth gear for a vehicle upshifting sequence. Likewise, transmission downshifting preferably sequences from fourth gear to third gear to second gear, while avoiding a direct jump from fourth gear to second gear. The shift hunting prevention feature is most advantageous for heavily-loaded vehicles traveling uphill on a steep grade when shift hunting more frequently is known to occur.

CRUISE CONTROL OVERSPEED REDUCTION

Figure 8A:
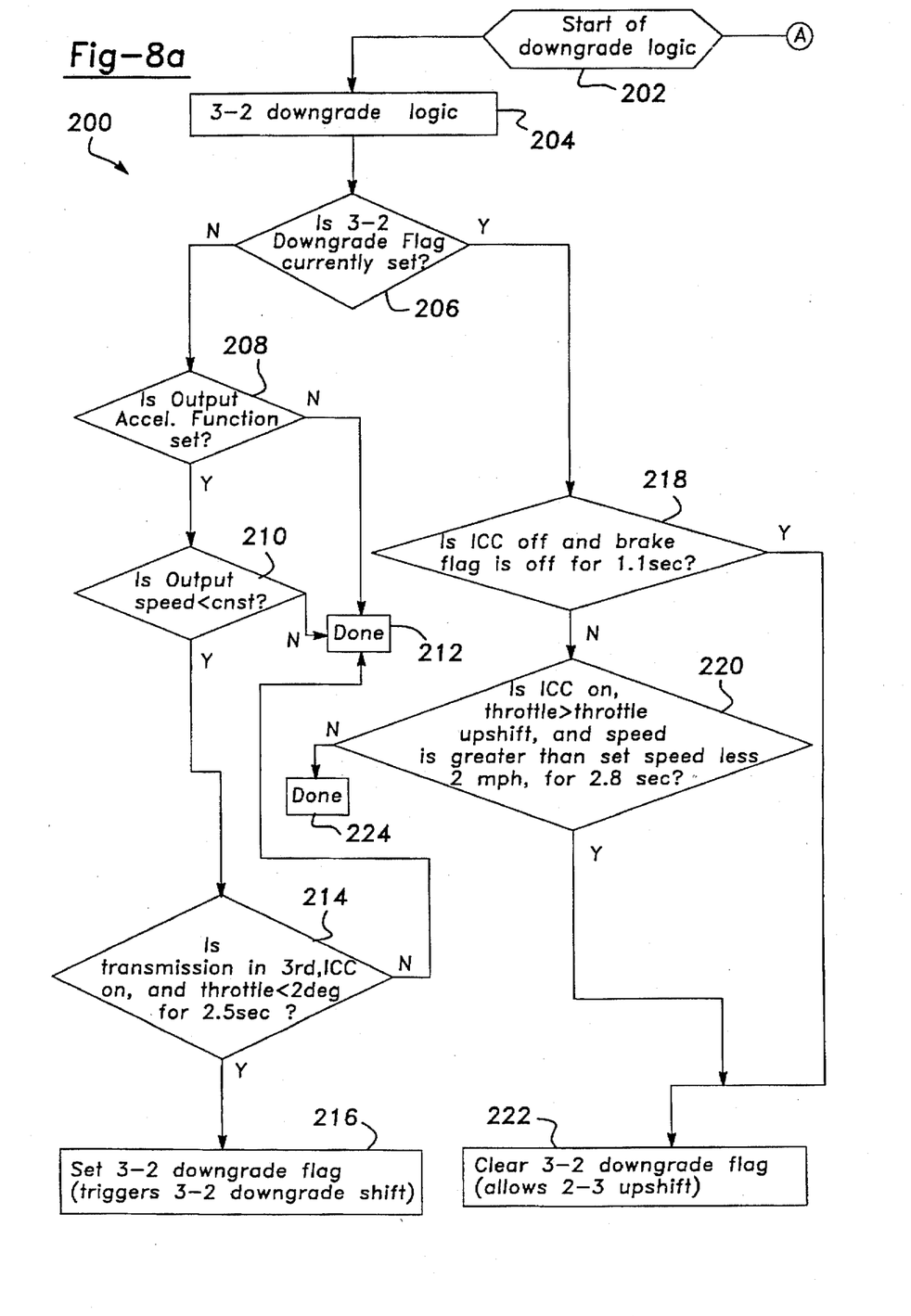
FIGS. 8A and 8B are flow diagrams illustrating a methodology for providing overspeed reduction for an automatic transmission with the cruise control system of the present invention.
Figure 8B:
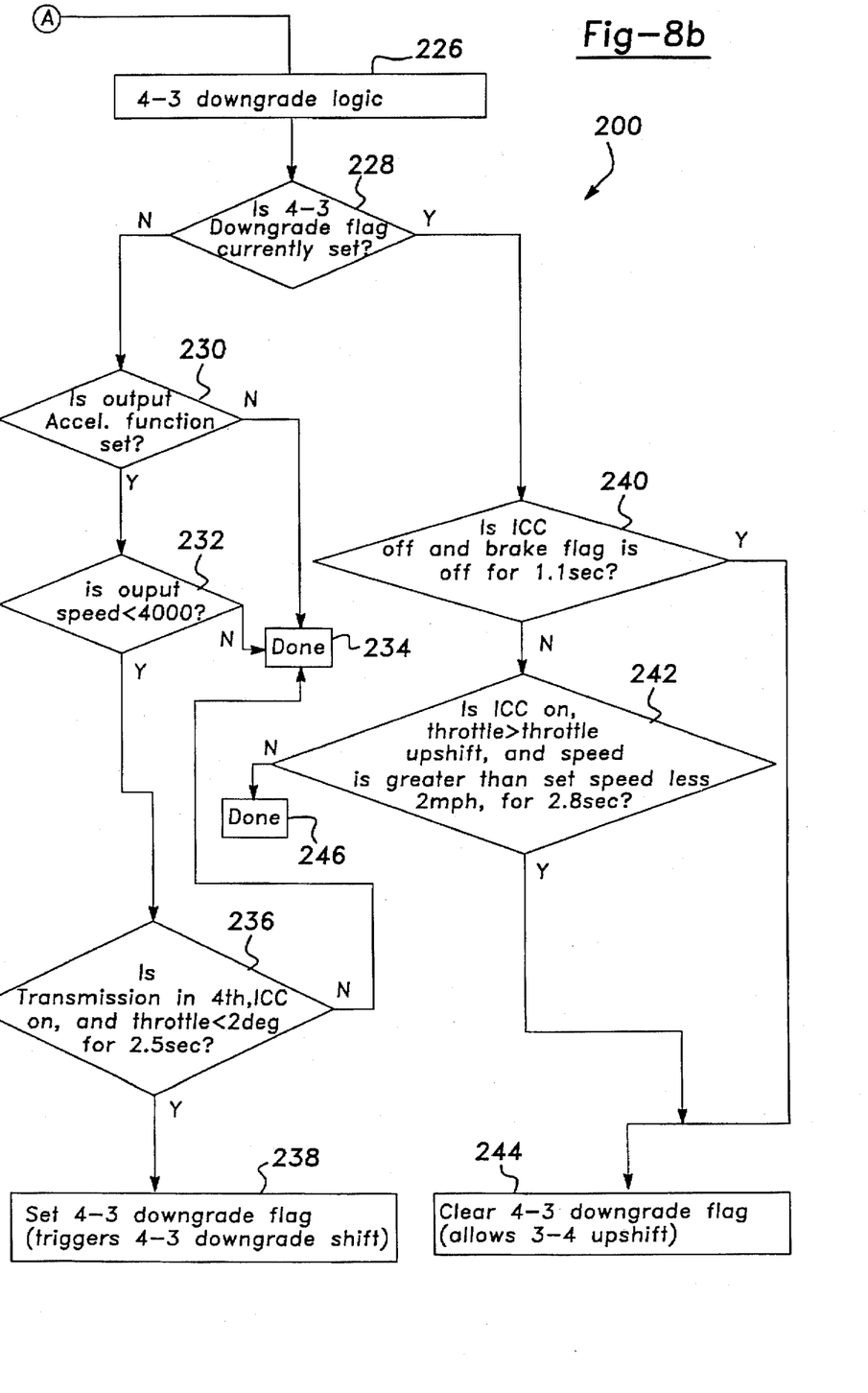

The interactive cruise control system 10 further includes an overspeed reduction feature as shown by methodology 200 in FIGS. 8A and 8B. Overspeed reduction methodology 200 operates to provide an automatic downshift of the automatic transmission to increase engine braking during the presence of an overspeed condition while operating the vehicle in cruise control. This advantageously brakes the vehicle to reduce speed so as to bring the vehicle speed to within an acceptable speed range according to the setpoint speed of the cruise control system 10.

The cruise control overspeed reduction downshift is provided when the vehicle speed exceeds the cruise control setpoint speed by a predetermined overspeed value while the throttle position is closed. According to one example, a predetermined overspeed value of four miles per hour above the setpoint speed may be employed. Subsequent to the overspeed reduction downshift, the cruise control system 10 continues normal operation. Once the throttle is opened to a throttle position of eight degrees, the transmission shifts back to the previous gear prior to the overspeed reduction downshift. Accordingly, an overspeed reduction downshift provides braking of the vehicle to bring the vehicle speed to within an acceptable speed range as determined by the cruise control system 10.

Referring now to FIG. 8A, overspeed reduction methodology 200 begins with start block 202 which proceeds to either the 3-2 downgrade logic block 204 or the 4-3 downgrade logic block 226. With the 3-2 downgrade logic block 204, decision block 206 checks to see if the 3-2 downgrade flag is currently set. If the 3-2 downgrade flag is currently set, methodology 200 proceeds to decision block 218 to determine if the integrated cruise control system 10 is currently off (e.g., deactivated) and the brake flag is off for a time period of 1.1 seconds. If the conditions of block 218 are met, methodology 200 proceeds to clear the 3-2 downgrade flag pursuant to block 222 which allows a 2-3 upshift. Otherwise, if either the integrated cruise control system is "on" or the brake flag is "on" as determined by block 218, methodology 200 proceeds to decision block 220 to determine if the integrated cruise control system 10 is on, the throttle is greater than a throttle upshift position, and the vehicle speed is greater than the setpoint speed less a reduced value of two miles-per-hour, for a 2.8 second time interval. If not, methodology 200 is done pursuant to block 224. However, if the conditions of decision block 220 are met, methodology 200 proceeds to clear the 3-2 downgrade flag pursuant to block 222 which effectively allows a 2-3 upshift to occur.

Referring back to decision block 206, if the 3-2 downgrade flag is currently not set, decision block 208 will check to see if the output acceleration function has been set and, if not, methodology 200 is done pursuant to block 212. If the output acceleration function is set, decision block 210 will check to see if the output speed is less than a constant value and, if not, methodology 200 is done pursuant to block 212. Otherwise, decision block 214 will check to see if the transmission is currently engaged in third gear, the integrated cruise control system 10 is "on", and the throttle position is less than two degrees for a time period of 2.5 seconds. If the conditions of block 214 are not met, methodology is done pursuant to block 212. If the conditions of decision block 214 are met, methodology 200 will proceed to block 216 to set the 3-2 downgrade flag. This in effect causes a 3-2 downgrade shift to occur so as to brake the vehicle and reduce vehicle speed in an attempt to maintain the vehicle speed at or near the cruise control setpoint speed.

Referring to FIG. 8B, the 4-3 downgrade logic 226 proceeds to decision block 228 to check if the 4-3 downgrade flag is currently set. If the 4-3 downgrade flag is currently set, methodology 200 proceeds to decision block 240 to determine if the integrated cruise control system 10 is currently "off" (e.g., deactivated) and the brake flag is "off" for a time period of 1.1 seconds. If the condition of decision block 240 are met, methodology 200 proceeds to clear the 4-3 downgrade flag pursuant to block 244. Clearing the 4-3 downgrade flag effectively allows a 3-4 upshift to occur. Otherwise, if either the cruise control is "on" or the brake flag is "on" as determined by block 240, methodology 200 proceeds to decision block 242 to determine if the integrated cruise control system 10 is "on", the throttle position is greater than a throttle upshift position, and the vehicle speed is greater than the setpoint speed less a reduced value of two miles-per-hour, for a 2.8 second time interval. If not, methodology 200 is done pursuant to block 246. However, if the conditions of block 242 are met, methodology 200 proceeds to clear the 4-3 downgrade flag pursuant to block 244 so as to allow a 3-4 upshift.

Referring back to decision block 228, if the 4-3 downgrade flag is currently not set, decision block 230 will check to see if the output acceleration function has been set and, if not, methodology 200 is done pursuant to block 234. If the output acceleration function is set, decision block 232 will check to see if the output speed is less than a constant value of 4,000 RPM and, if not, methodology 200 is done pursuant to block 234. Otherwise, decision block 236 will check to see if the transmission is currently engaged in fourth gear, the integrated cruise control system 10 is "on", and the throttle position is less than two degrees for a time period of 2.5 seconds. If the conditions of block 236 are not met, methodology 200 is done pursuant to block 234. If the conditions of decision block 236 are met, methodology 200 will proceed to block 238 to set the 4-3 downgrade flag. This in effect causes a 4-3 downgrade shift to occur so as to brake the vehicle and reduce vehicle speed in an attempt to maintain the vehicle speed at or near the cruise control setpoint speed.

While a specific embodiment of the invention has been shown and described in detail to illustrate the principles of the present invention, it should be understood that the invention may be embodied otherwise without departing from such principles. For example, one skilled in the art will readily recognize from such discussion and from the accompanying drawings that various changes, modifications and variations can be made without departing from the spirit and scope of the present invention as described in the following claims.

What is claimed is:

1. A method of controlling transmission gear shifts in an automatic transmission of a vehicle so as to prevent the occurrence of shift hunting, said method comprising the steps of:

engaging the automatic transmission in a first gear;

determining torque required to maintain a predetermined speed in the first gear;

predicting a maximum torque available in an upshift condition of the transmission to a second gear;

inhibiting an upshift from the first gear to the second gear when the predicted maximum torque available in the second gear is less than the determined torque required to maintain the predetermined speed in the first gear;

providing an upshift to the second gear once the determined maximum torque available in the second gear exceeds the determined torque required to maintain the predetermined speed in the first gear;

determining torque required to maintain the predetermined speed in the second gear;

predicting a maximum torque available in an upshift condition of the transmission to a third gear, said third gear being the next highest gear above said second gear; and inhibiting an upshift from the second gear to the third gear when the predicted maximum torque available in the third gear is less than the determined torque required to maintain the predetermined speed in the second gear.

2. The method as defined in claim 1 further comprising the step of requiring transitions between the first gear, the second gear and the third gear without skipping over the second gear.

3. The method as defined in claim 1 wherein said automatic transmission is a four speed transmission wherein said first, second and third gears comprises second, third and fourth gears, respectively of the transmission.

4. The method as defined in claim 1 wherein said method further comprises maintaining said predetermined speed as a cruise control setpoint speed.

5. An automatic transmission of a vehicle that prevents the occurrence of shift hunting, said automatic transmission comprising:

a first gear;

a second gear which has a higher gear ratio than the first gear;

a third gear which has a higher gear ratio than the second gear;

means for determining torque required to maintain a predetermined speed in the first gear;

means for predicting a maximum torque available in an upshift condition of the transmission to the second gear;

first control means for inhibiting an upshift from the first gear to the second gear when the predicted maximum torque available in the second gear is less than the determined torque required to maintain the predetermined speed in the first gear, said first control means allowing an upshift to the second gear once the determined maximum torque available in the second gear exceeds the determined torque required to maintain the predetermined speed in the first gear;

means for determining torque required to maintain the predetermined speed in the second gear;

means for predicting a maximum torque available in an upshift condition of the transmission to the third gear; and second control means for inhibiting an upshift from the second gear to the third gear when the predicted maximum torque available in the third gear is less than the determined torque required to maintain the predetermined speed in the second gear.

6. The automatic transmission as defined in claim 5 wherein the transmission requires transitions between the first gear, the second gear and the third gear without skipping over the second gear.

7. The automatic transmission as defined in claim 5 wherein said transmission comprises a four speed transmission and the first, second and third gears provide second, third and fourth gears, respectively, of the transmission.

* * * * *